US011099822B2

(12) United States Patent
Goniwada (10) Patent No.: US 11,099,822 B2
(45) Date of Patent: Aug. 24, 2021

(54) SYSTEM AND METHOD FOR DEPLOYING A DISTRIBUTED COMPONENT-BASED APPLICATION

(71) Applicant: Accenture Global Solutions Limited, Dublin (IE)

(72) Inventor: Shivakumar Rudrappa Goniwada, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 407 days.

(21) Appl. No.: 15/974,125

(22) Filed: May 8, 2018

(65) Prior Publication Data

US 2019/0347083 A1    Nov. 14, 2019

(51) Int. Cl.
*G06F 9/455*    (2018.01)
*G06F 8/61*    (2018.01)

(52) U.S. Cl.
CPC ............ *G06F 8/63* (2013.01); *G06F 9/45558* (2013.01); *G06F 2009/4557* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| 5,625,841 A * | 4/1997 | Dawkins | G06F 11/006 |
| | | | 710/15 |
| 5,892,945 A * | 4/1999 | Mirchandaney | G06F 9/5027 |
| | | | 718/104 |
| 8,499,297 B2 * | 7/2013 | Chen | G06F 11/1438 |
| | | | 718/1 |
| 8,959,513 B1 * | 2/2015 | Swaminathan | G06F 9/5005 |
| | | | 718/1 |
| 9,887,876 B2 | 2/2018 | Kumar et al. | |
| 10,452,372 B2 * | 10/2019 | Lundberg | G06F 8/60 |
| 2016/0127254 A1 | 5/2016 | Kumar et al. | |

FOREIGN PATENT DOCUMENTS

WO    2017025203 A1    2/2017

OTHER PUBLICATIONS

Shet, Shivshankar, "Limitations of a Monolithic Application and Need for Adapting Micro Services Architecture," Java Code Geeks, Java 2 Java Developers Resource Center, May 3, 2016, retrieved from the Internet: <https://www.javacodegeeks.com/2016/05/limitations-monolithic-application-need-adapting-micro-services-architecture.html>, 8 pages.

(Continued)

*Primary Examiner* — Paul Yen
(74) *Attorney, Agent, or Firm* — Plumsea Law Group, LLC (57) ABSTRACT

A system and method for deploying a distributed component-based application is disclosed. The system may include a plurality of uniform base components. Each base component of the plurality of uniform base components may host a respective service component, and may include an input port, an output port, a service port, an error, log, and exception port, a monitoring port, and a control port. A first base component may process event messages asynchronously with a second base component and a third base component. The system and method may also support auto-scalability of each base component.

20 Claims, 7 Drawing Sheets

(56) References Cited

OTHER PUBLICATIONS

Pepalis, Bob, "5 Benefits of a 3-Tier Architecture," Izenda, Inc., Mar. 14, 2017, retrieved from the Internet: <https://www.izenda.com/blog/5-benefits-3-tier-architecture/>, 6 pages.
Examination Report dated Jan. 16, 2020 in Australia Patent Application No. 2019203092.
Dragoni et al., 'Microservices: How to Make Your Application Scale,' A.P. Ershov Informatics Conference (the PSI Conference Series, 11th edition), Jun. 2017, Moscow, Russia, hal-01636132. Retrieved from the Internet: <URL:https://hal.inria.fr/hal-01636132>.
Merkel, D., 'Docker: Lightweight Linux Containers for Consistent Development and Deployment', Linux Journal, May 19, 2014. Retreived from the Internet: <URL: https://www.linuxjournal.com/content/docker-lightweight-linux-containers-consistent-development-and-deployment>.
Response to Examination Report filed May 5, 2020 in Australian Patent Application No. 2019203092.
Examination Report No. 2 dated May 29, 2020 in Australia Patent Application No. 2019203092.
Response to Examination Report No. 2, filed Sep. 17, 2020, in Australian Patent Application No. 2019203092.
Notice of Acceptance for Patent Application dated Dec. 23, 2020 in Australia Patent Application No. 2019203092.
Examination Report No. 3 dated Oct. 13, 2020 in Australia Patent Application No. 2019203092.
Response to Examination Report No. 3, filed Dec. 7, 2020 in Australia Patent Application No. 2019203092.

\* cited by examiner

SYSTEM AND METHOD FOR DEPLOYING A DISTRIBUTED COMPONENT-BASED APPLICATION

TECHNICAL FIELD

The present disclosure generally relates to computer system architectures. More specifically, the present disclosure generally relates to a system and method for deploying a distributed component-based architecture, using a box-and-port-style component-less architecture pattern and asynchronous processing, providing an event-driven and service-based architecture.

BACKGROUND

A monolithic software application is generally regarded as a single-tiered or multi-tiered software application in which the user interface and data access code are combined into a single program from a single platform, and which is self-contained and independent from other computing applications. Typically, software components of an application are assembled together and tightly packaged (e.g., in EAR (Enterprise Application aRchive), WAR (Web Application ARchive or Web Application Resource), and JAR (Java ARchive) formats for Java Programming Language), and are deployed as a single unit on a single application server. The software components may accomplish many different business services, which are packed together as a single unit (i.e., tightly coupled) and tightly integrated with the application. Business services may include, for example, auto-fulfillment, auto-processing, and stock management.

Because a monolithic application is packaged as a single unit, deployment is relatively straightforward. However, the single unit packaging leads to significant drawbacks such as reduced agility, inability to accommodate continuous delivery and deployment, and inefficient scalability. For example, if one component in an application must be changed, the entire monolithic application must be repackaged and assembled together, which consumes time and resources, requires system downtime, and slows the delivery of new application features. Regarding scalability, additional instances of a monolithic application may be deployed horizontally to accommodate higher demand for certain services of the application; however, resources used to support other duplicated less-in-demand services are wasted because those other services do not have a need to scale.

There is a need in the art for a system and method that address the shortcomings discussed above.

SUMMARY

A system and method for deploying a distributed component-based application are disclosed. In contrast to the drawbacks of monolithic applications, the present embodiments employ microservice architectures, which decompose applications into different, smaller, loosely-coupled services. The smaller components may operate independently and improve modularity, and allow for parallel and continuous development, deployment, and scaling. For example, the business services of auto-fulfillment, auto-processing, and stock management may be handled by independent components, which each may be developed, deployed, revised, and scaled differently according to their particular requirements.

To manage the deployment and development of many different independent components, and to coordinate communications and functions between those many components, embodiments of the system and method use base components as fundamental infrastructure components, each of which works in tandem with a service component that performs a specific service function, such as a business function. Each service component is wrapped by a base component, which may have a box and port structure, or pattern, that transforms the business functions of the business component to technical parameters and manages communications with other base components. The base components, each with its own service component, may be deployed on a distributed component-based application. The base components are uniform and generic, allowing them to be paired with any service component and to readily communicate with any other base component. In addition, in embodiments, the base components may be configured to communicate with each other using asynchronous processing, which may improve resource utilization and reduce processing latency.

The disclosed system and method therefore address the shortcomings and challenges discussed above by providing a fundamental infrastructure component that can be conveniently paired with a service component and readily deployed. The fundamental base component may provide, in a cost-effective and time-efficient manner, a desired level of agility, timeliness, availability, reliability, scalability, and extensibility.

In one aspect, the disclosure provides a computer-based application system for deploying a distributed component-based application. The system may include a plurality of uniform base components. Each base component of the plurality of uniform base components may host a respective service component. Each base component may include an input port, an output port, a service port, an error, log, and exception port, a monitoring port, and a control port.

Another aspect of the disclosure provides a computer-implemented method for deploying a distributed component-based application. The method may include providing a plurality of uniform base components, with each base component of the plurality of uniform base components configured to receive a respective service component, and having an input port, an output port, a service port, an error, log, and exception port, a monitoring port, and a control port. The method may further include provisioning a first service component in a first base component of the plurality of uniform base components, and provisioning a second service component in a second base component of the plurality of uniform base components. The first base component may send event messages to the second base component.

Another aspect of the disclosure provides another computer-implemented method for deploying a distributed component-based application. The method may include providing a plurality of base components. Each base component of the plurality of uniform base components may have a uniform box and port pattern. Each base component may wrap a respective service component. The method may include provisioning a first service component in a first base component of the plurality of base components, and provisioning a second service component in a second base component of the plurality of base components. The first base component may send event messages to the second base component.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Embodiments provide systems and methods for deploying distributed component-based applications. The distributed components may be part of a microservice architecture, in which the components operate independently. In embodiments, each distributed component may include a service component wrapped by a base component. Each base component may be a generic, uniform structure that is pairable with any service component, and suitable for managing communications with any other paired base component. The distributed base components may facilitate a flexible, readily-deployable, modular architecture.

Figure 1:
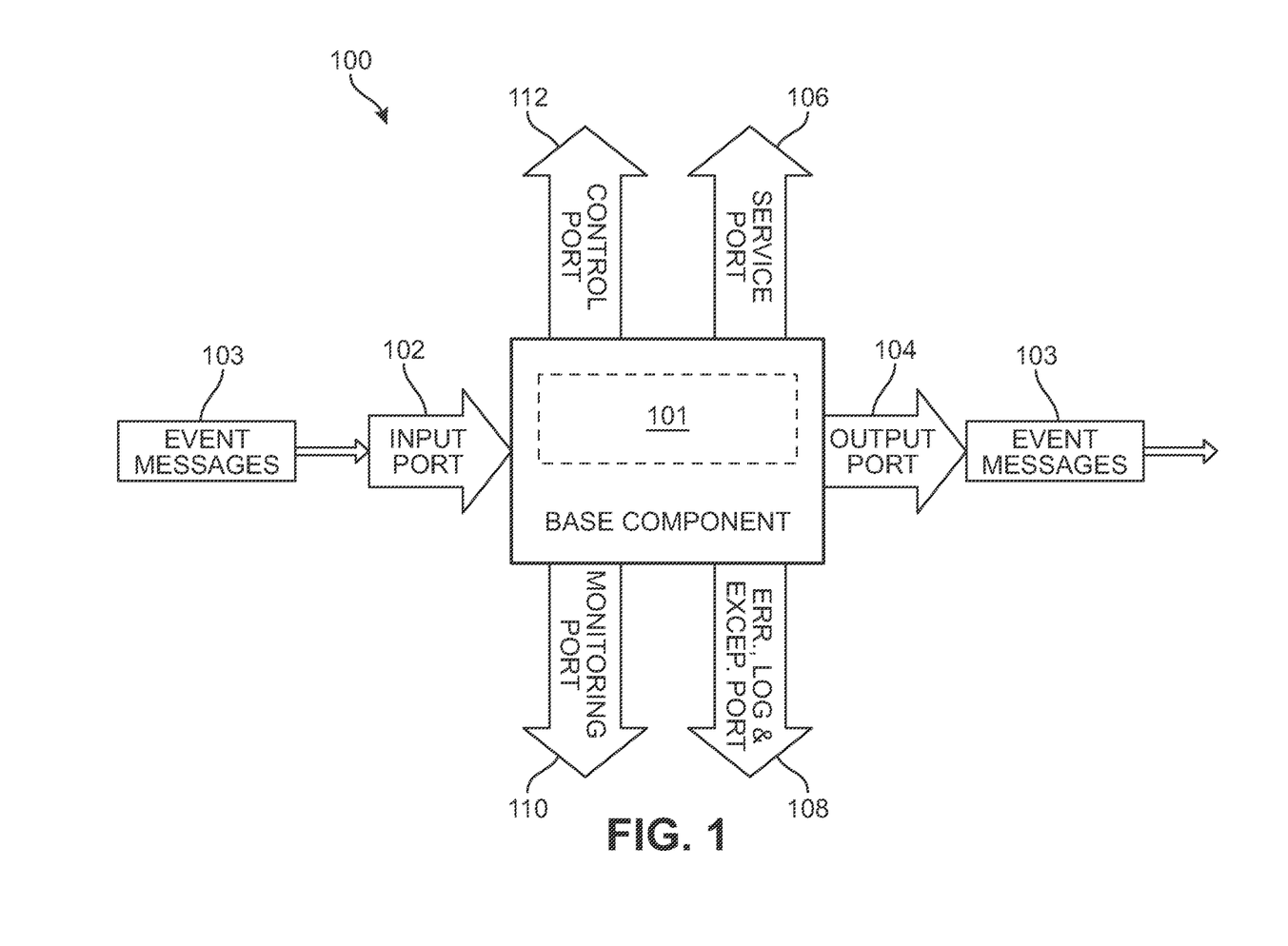
FIG. 1 is a schematic diagram of an embodiment of a base component.

FIG. 1 illustrates an embodiment of a base component 100. As shown, base component 100 may have a box and port structure, or pattern, and may be configured to receive a service component, which is represented by the dashed box 101 in FIG. 1. In embodiments, the base components may be configured to manage events; convert message formats; capture error, exception, and log messages and send them to respective queues; monitor service components; and expose services in multiple protocols such as Hypertext Transfer Protocol (HTTP), Java Message Service (JMS), and Transmission Control Protocol (TCP). To provide such functionality, as shown in the example of FIG. 1, base component 100 may include one or more communication ports for communicating with other components, including other base components. The communication ports may include an input port 102, an output port 104, a service port 106, an error, log, and exception port 108, a monitoring port 110, and a control port 112.

Input port 102 may be configured to receive event messages 103 from another component. Similarly, output port 104 may be configured to send event messages 103 to yet another component. The input port 102 and output port 104 may include an inbuilt converter to convert the formats of event messages, for example, converting Java Object to JSON (JavaScript Object Notation) and JSON to Java Object (marshal and unmarshal). Event messages may also be sent by, for example, XML (eXtensible Markup Language).

Service port 106 may be configured to expose services of a service component in multiple protocols, such as HTTP, JMS, TCP, POJO (Plain Old Java Object) APIs (Application Programming Interfaces), and WS* (web services). For example, service port 106 may provide HTTP or MQ (Message Queue) endpoints to expose service components, and may expose JSON format to consumers.

Error, log, and exception port 108 may be configured to capture error, exception, and log messages, and communicate that information to respective queues and to an error database. The error information may include, for example, error rates and exception rates.

Monitoring port 110 may be configured to provide instrumentation information, which may allow an outside component to observe the processing of the base component and its service component. For example, monitoring port 110 may be used to monitor and communicate parameters such as CPU usage, health of machine, heartbeat, memory consumption, and number of requests being processed. An agent present in the framework of base component 100 may capture the parameter data and send the parameter data to monitoring port 110 at regular intervals, for example, every five minutes. Monitoring port 110 may be used to publish performance and other statistics to a dashboard. The operation monitoring may include, for example, (1) heartbeat monitoring; (2) the actual latency of every input-to-output event flow, as well as average latency over a time window; (3) the actual wait time for every input and output event; and (3) error and exception rates. Monitoring port 110 may be configured to communicate with a separate management component, which processes the parameter data for display and action, and which is described in more detail below.

Control port 112 may be configured to send and receive control messages relating to the functioning of base component 100 and its wrapped service component. For example, if demand for the service component exceeds the capabilities of the service component, control port 104 may send a control message advising of the deficiency and requesting assistance. Control port 104 may also be used to control base component 100 and its wrapped service component from the outside, for example, by sending control messages to base component 100. For example, control port 104 can be used to resume and suspend service components and control processing rate. Control port 104 may be configured to communicate with a separate director component, which handles such requests, and which is described in more detail below.

Although for illustration purposes, FIG. 1 shows the ports of base component 100 as separate, two or more ports could be combined and still accomplish the same functions described above.

As shown in FIG. 1, base component 100 may provide a fundamental, uniform pattern for supporting a service component, and for allowing the service component to communicate and function over a distributed component-based platform, with other paired base and service components. The adaptable and modular characteristics of base components may therefore provide surprising benefits in terms of agility, timeliness, availability, reliability, scalability, extensibility, simplicity, and cost-savings. Base components may provide the surrounding infrastructure for service components and may be deployed in the cloud, in on-premises containers, and also in pods.

Thus, in the box and port style of architecture of embodiments disclosed herein, there may be more ports for a box pattern, with some being providers of information, some being listeners of information, some providing error and logger ports, and some providing the health of components. In embodiments, the components may be monitored and may listen in synchronous as well as asynchronous ways. Components may listen for addresses of WAR (Web Application ARchive or Web Application Resource) files, which are files used to distribute a collection of resources that comprise a web application, for example, including resources such as JAR (Java ARchive) files, JavaServer Pages, Java Servlets, Java classes, XML files, tag libraries, and static web pages. In an exemplary implementation, to listen for each WAR file address, an application may be configured with separate sub domains. This may help for extensibility and maintainability, as well as provide flexibility in deployments. In embodiments, the WAR files may be deployed in a separate server or separate environments; for example, a WAR file 'A' can be deployed in open security (less secured environment), a WAR file 'B' can be deployed in a high secured zone, and a WAR file 'C' (high network traffic) can be deployed into separate server altogether.

Figure 2:
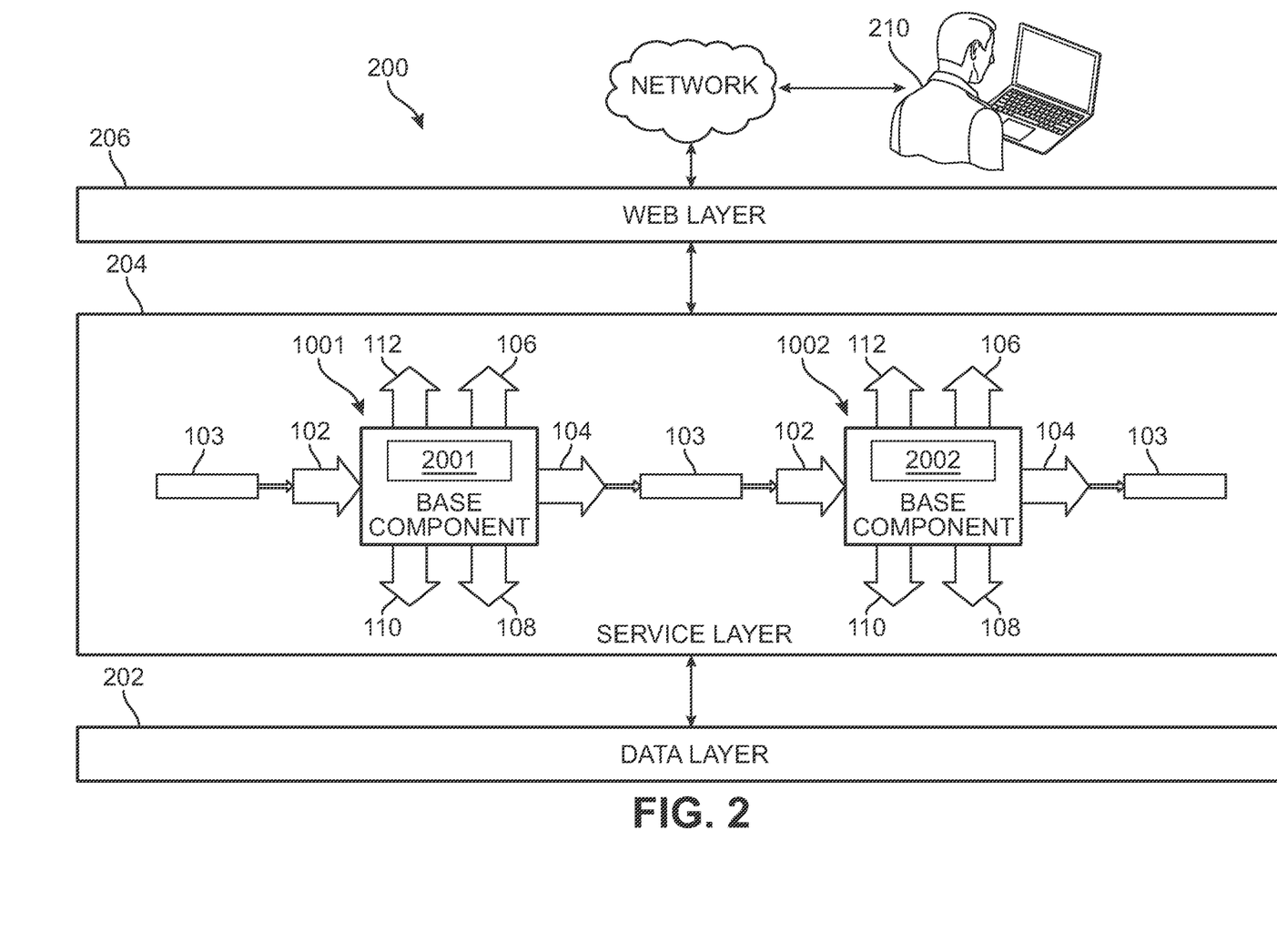
FIG. 2 is a schematic diagram of an embodiment of a web application system incorporating multiple base components.

FIG. 2 illustrates an embodiment of a web application system 200, which incorporates multiple base components, each supporting a different wrapped service component. As shown, web application system 200 may include a data layer 202, a service (or application) layer 204 in communication with the data layer 202, and a web (or presentation) layer 206 in communication with the service layer 204. Web application system 200 may also include a network 208 in communication with the web layer 206. A user 210 of the web application may communicate with the web layer 206 through network 208. In some embodiments, network 208 may be a wide area network (WAN), e.g., the Internet. In other embodiments, the network may be a local area network (LAN), for example, when the Internet may not be available, as in a more remote location far from a metropolitan area. In yet other embodiments, the network may be a combination of a WAN and a LAN.

A web application, including a web layer, service layer, and data layer, may reside in a single computer, the partial computing resources of a single computer, a plurality of computers communicating with one another, or a network of remote servers (e.g., cloud).

As shown in FIG. 2, a first base component 1001 and a second base component 1002 may be distributed within the service layer 204, and may communicate with each other and with other components, using the ports and functions described above. First base component 1001 may include a first service component 2001, which may be, for example, a business component such as auto-fulfillment. Second base component 1002 may include a second service component 2002, which may be, for example, a different business component such as stock management. The responsibility of the service components may be to perform and execute the service functionality, for example, a particular business functionality such as order processing.

Within the distributed component-based platform of the service layer 204, event messages 103 may be passed from first base component 1001 to second base component 1002 using messaging or service channels. In embodiments, service components wrapped in the base components, such as first service component 2001 and second service component 2002, contain core service logic and do not interact directly with other components. Instead, the service components may connect with other components using the ports of their respective base component. In effect, each service component may be wrapped by a base component that transforms the service logic to technical parameters, metrics, and/or data, and that communicates such technical information to other components.

Figure 3:
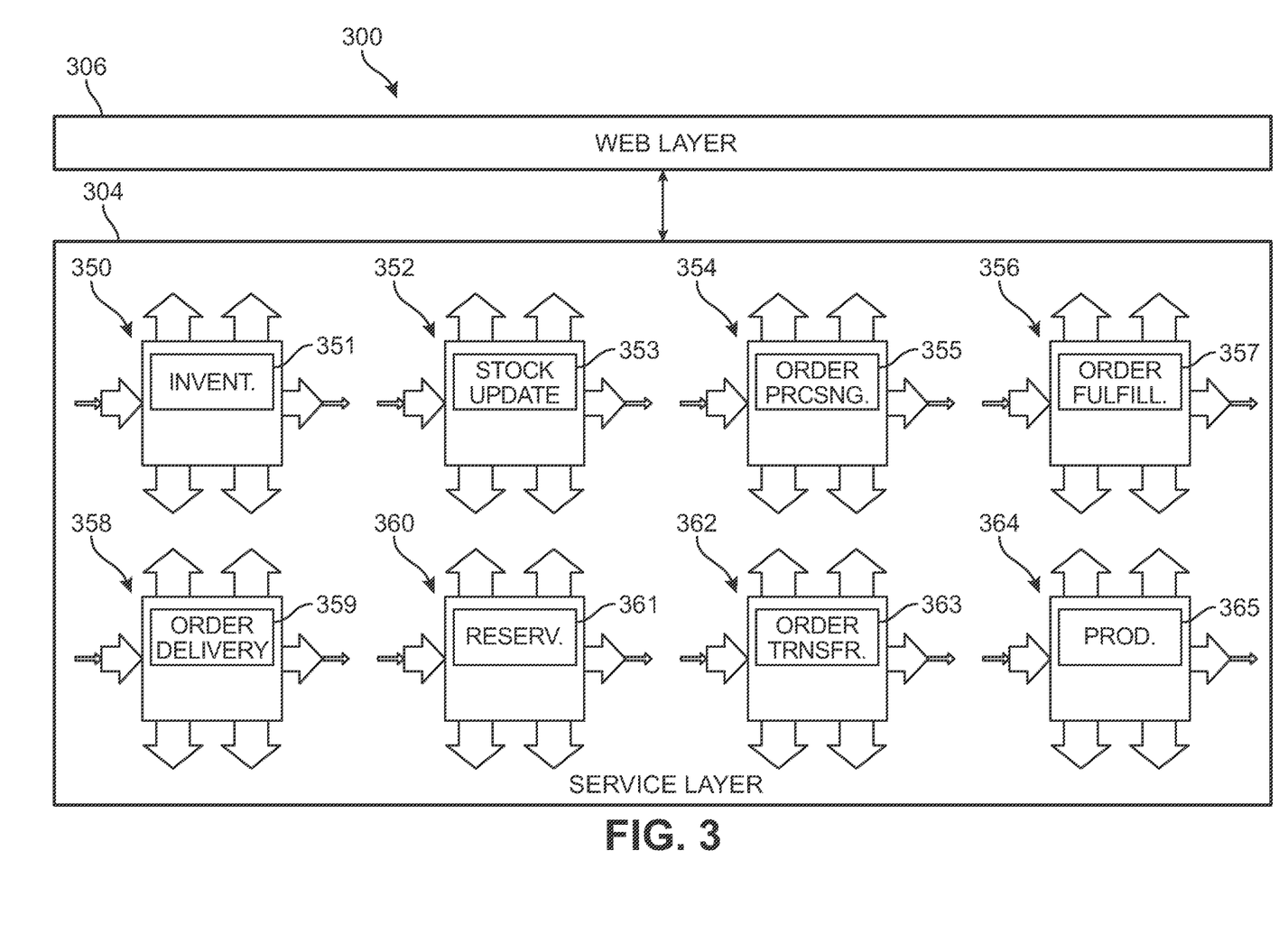
FIG. 3 is a schematic diagram of an embodiment of web application configured to execute particular business functions.

Although for illustration purposes FIG. 2 shows only two base components, additional base components may reside in the service layer 204 and may communicate with all other base components in a manner the same or similar as the manner of communication between first base component 1001 and second base component 1002. As an example, FIG. 3 illustrates an application system 300 configured to execute various business functions of a retail application, such as an e-commerce application. For simplicity, FIG. 3 shows only a portion of application system 300, including a web layer 306 and a service layer 304. As shown, service layer 304 is provisioned with a plurality of base components, each having the box and port pattern described above and supporting a service component configured to accomplish a business function of the retail application. For example, a base component 350 includes an inventory service component 351, a base component 352 includes a stock update service component 353, a base component 354 includes an order processing service component 355, a base component 356 includes an order fulfillment service component 357, a base component 358 includes an order delivery component 359, a base component 360 includes a reservation service component 361, a base component 362 includes an order transfer service component 363, and a base component 364 includes a products service component 365.

In another example (not shown) in which an application system is configured to execute various business functions of a bank, the service layer may include a plurality of base components each having the box and port pattern described above and supporting a service component configured to accomplish a business function of the bank. In this example, a first base component may include an exposure service component, a second base component may include a contract setup service component, a third base component may include a risk management service component, a fourth base component may include a collateral management service component, a fifth base component may include a settlement order service component, a sixth base component may include an event submission service component, a seventh base component may include a processing service component, and an eighth base component may include a user management service component.

For each base component, the box and port style of architecture of the base component may perform the functions described above, for example, event management, error and exception logging, and monitoring management. The modular approach of service layer 304 shown in FIG. 3 may provide benefits in deploying the application system 300, for example, allowing a project team to focus on building business components, with the rest of the infrastructure managed by the box and port style architecture of the base components, which each may be deployable in the container and cloud.

As shown in FIGS. 2 and 3, base components may function based on the concept of input and output ports. Unlike typical object-oriented design in which one object can invoke a method on another object, the base components of the present embodiments may not invoke methods, and may not call services of other components. Rather, referring to FIG. 2, first base component 1001 may send an event message 103 to second base component 1002, and then may continue processing other input events. A response to a request may arrive asynchronously at an input port, at which point the base component may correlate that response to an earlier request and act accordingly.

Based on this method of asynchronous processing, embodiments may avoid propagation of internal processing delays to the overall processing capability of the service layer and the web application system, because base components may continue to perform other needed functions while awaiting delayed replies. This asynchronous processing approach may therefore lead to surprising, beneficial technical improvements in better resource utilization and reduced processing latency. Events that flow from an output port to an input port may be buffered by the framework, to allow for temporary local overload situations without impact to the overall application.

Figure 4:
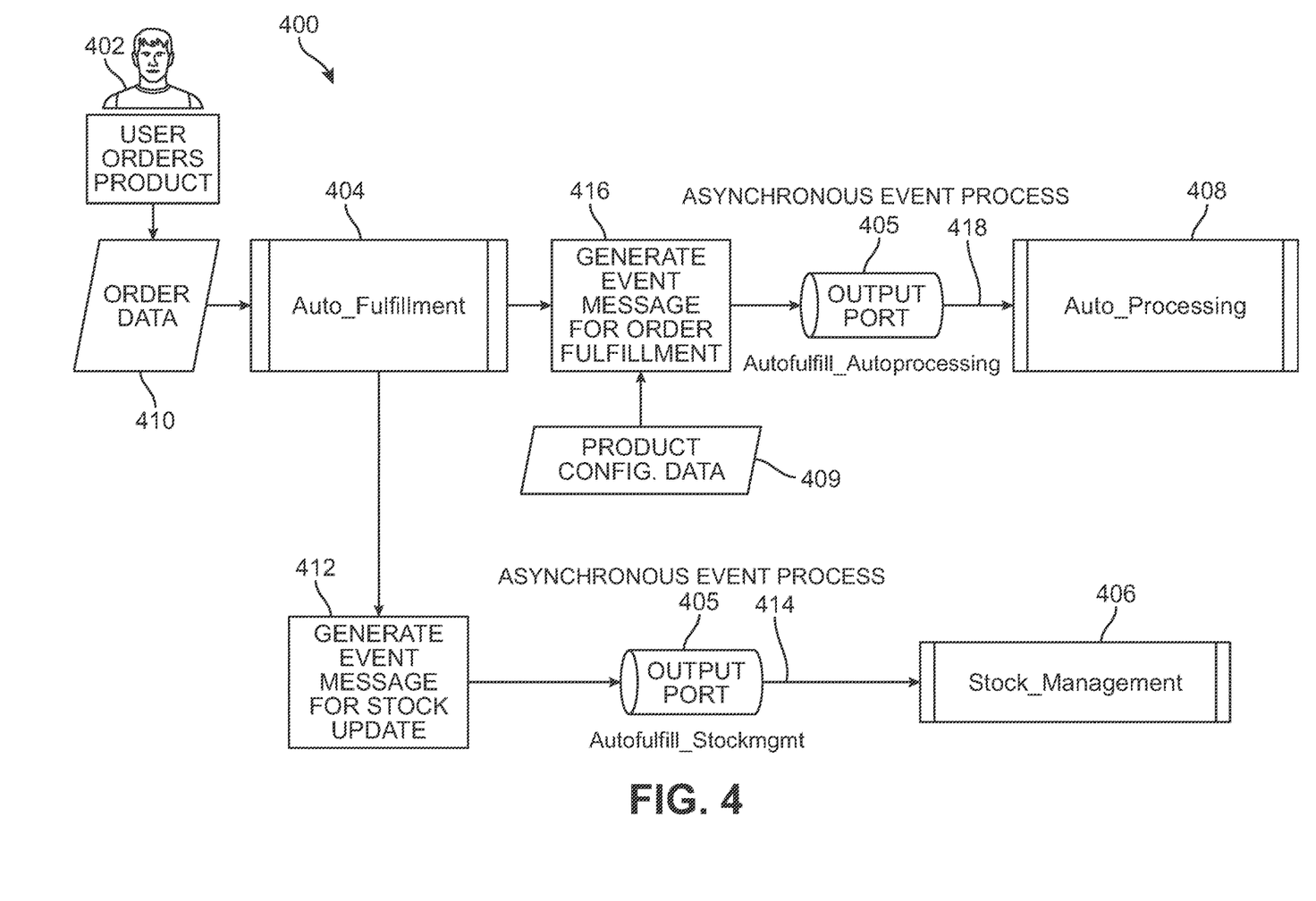
FIG. 4 is a flowchart illustrating an exemplary method of asynchronous processing, according to an embodiment.

FIG. 4 illustrates an exemplary method 400 of asynchronous processing according to an embodiment. In this example, a user 402 is submitting a product order (e.g., ordering a mobile telephone), which is being handled by a first base component 404 supporting an auto-fulfillment service component, a second base component 406 supporting a stock management service component, and a third base component 408 supporting an auto-processing service component. As shown, method 400 begins in step 410 with the auto-fulfillment base component 404 receiving the order data from the user 402. Auto-fulfillment base component 404 may be considered a sender component, which is configured to send messages in response to receiving an event, which in this case is a product order.

After the order data is received, method 400 continues in step 412 in which auto-fulfillment base component 404, in response to the order data, generates an event message for product stock update and places that event message (e.g., "Autofulfill_StockMgmt") in a message queue through its output port 405.

Then, in step 414, method 400 continues with stock management base component 406, as the receiving component, receiving the event message from the message queue and processing the change in stock, for example, decrementing the total stock by one to account for the ordered product.

According to asynchronous event processing, after auto-fulfillment base component 404 generates the event message for product stock update in step 412, auto-fulfillment base component 404 does not wait for a reply message before processing other event messages. Instead, auto-fulfillment base component 404 operates under essentially a fire and forget paradigm.

Accordingly, just after or concurrent with step 412, and concurrent with step 414, method 400 continues in step 416 in which auto-fulfillment base component 404 generates an event message for order fulfillment, which may include incorporating product configuration data 409 associated with the ordered product. Auto-fulfillment base component places that event message (e.g., "Auto_fulfill_Autoprocessing") in a message queue through its output port 405 (shown twice in FIG. 4 for illustration purposes).

Then, in step 418, method 400 continues with auto-processing base component 408, as the receiving component, receiving the event message from the message queue and processing the order fulfillment.

Thus, as shown by exemplary method 400, asynchronous messaging does not wait for a message to process in another component. An event received by a first sending base component triggers generation of an event message and placement of that event into a message queue, after which a second receiving base component receives the event message from the same queue and processes the event message upon arrival. In this manner, messages may be event driven and asynchronous in nature, which may provide seamless message flow. For example, referring to FIG. 4, auto-fulfillment base component 404 does not wait for stock management base component 406 to process messages before generating and forwarding event messages for auto-processing base component 408.

Figure 5:
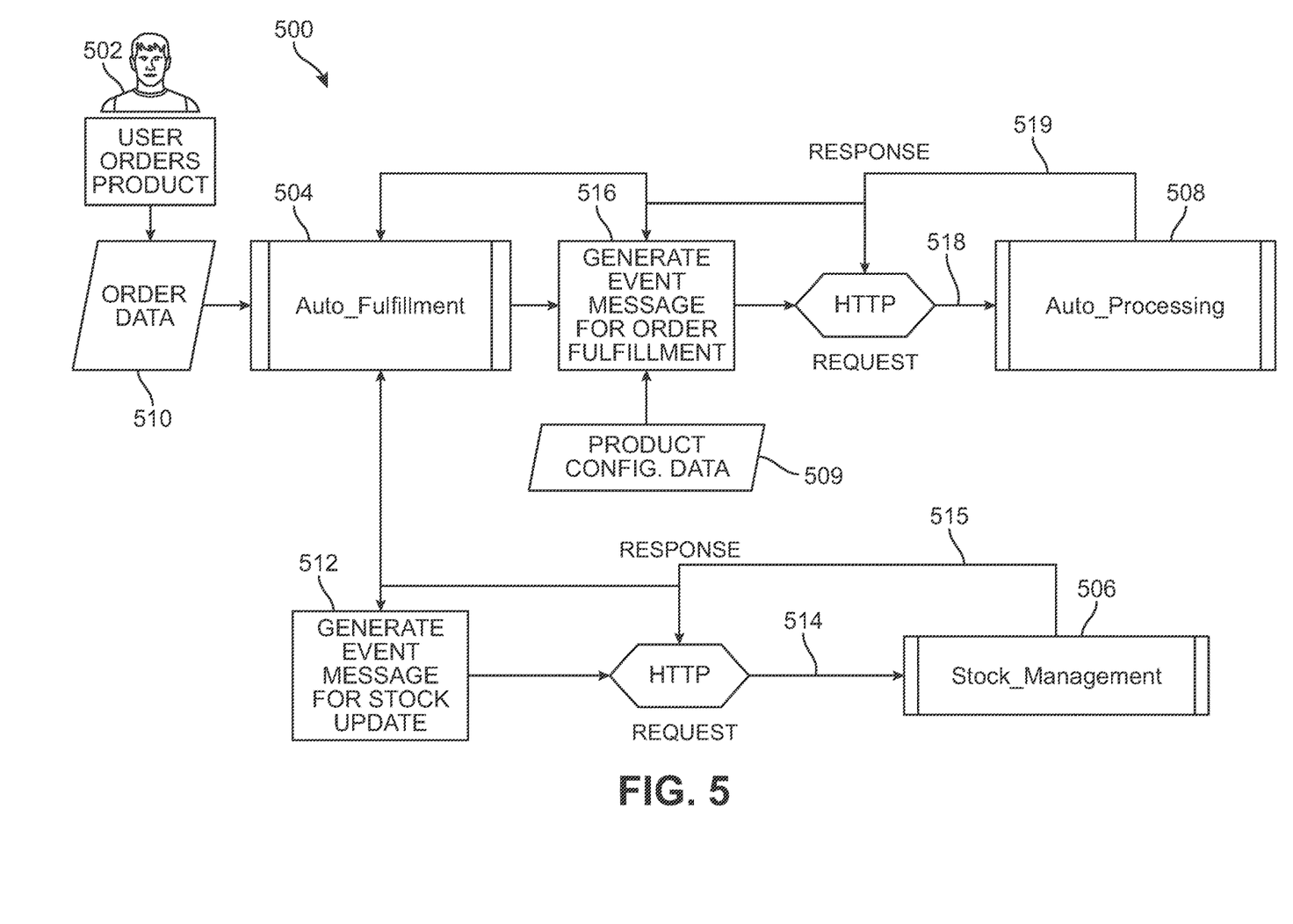
FIG. 5 is a flowchart illustrating an exemplary method of synchronous processing, according to an embodiment.

The asynchronous processing of the present embodiments provides technical improvements relative to processing speed and resource utilization, especially in comparison to synchronous processing, an example of which is illustrated in FIG. 5. As shown, synchronous processing method 500 involves a user 502 submitting the same type of product order (e.g., ordering a mobile telephone) as in FIG. 4. However, this synchronous processing method 500 uses components that lack the box and port pattern described above. Instead, method 500 is based on object-oriented design, using a first auto-fulfillment object 504, a second stock management object 506, and a third auto-processing object 508. In this design, an object can invoke a method on another object.

As shown in FIG. 5, method 500 may begin in step 510 with auto-fulfillment object 504 receiving the order data from the user 502. Following synchronous processing, auto-fulfillment object 504 may be configured to allocate a separate thread for each request received from a user, and to wait for a response from an object before processing additional requests. Thus, after receiving the order data in step 510, method 500 continues in step 512 in which auto-fulfillment object 504 generates an event message for product stock update, forwards that event message to stock management 506 using, for example, HTTP, and waits for a response before processing any additional requests.

With auto-fulfillment object 504 on hold, method 500 continues in step 514 with stock management object 506 receiving the event message and processing the change in stock, for example, decrementing the total stock by one to account for the ordered product.

With the event message processed, stock management object 506 then forwards a response to auto-fulfillment object 504 in step 515. The response may be returned via HTTP, for example.

Only after receiving the response does auto-fulfillment object 504 turn to the next request, which in this example is the generation of an event message for order fulfillment as shown in step 516. That event message may include incorporating product configuration data 509 associated with the ordered product. Auto-fulfillment object 504 forwards that event message to the auto-processing object 508, through a separate thread and using, for example, HTTP. At this point, auto-fulfillment object 504 again waits for a response before proceeding with any other request processing.

With auto-fulfillment object 504 on hold, method 500 continues in step 518 with auto-processing object 508 receiving the event message and processing the order fulfillment.

With the event message processed, auto-processing object 508 then forwards a response to auto-fulfillment object 504 in step 519. The response may be returned via HTTP, for example.

As evident from method 500, synchronous processing may delay message processing and waste resources. In contrast, the asynchronous processing of method 400 of FIG. 4, which is based on the box and port pattern of the base components, may increase processing speed, may utilize resources more efficiently, and may reduce processing latency.

Figure 6:
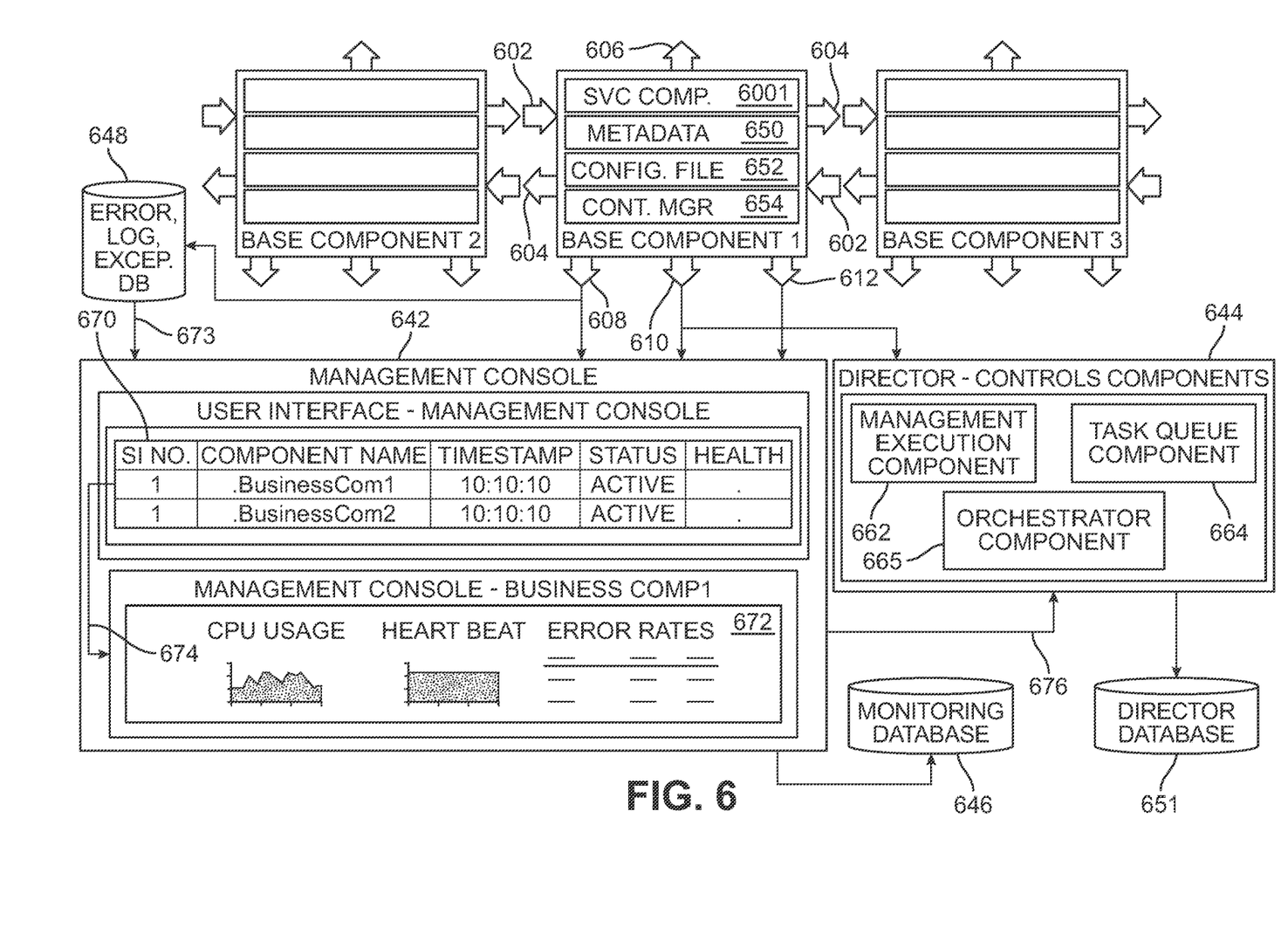
FIG. 6 is a schematic diagram of a system and method for deploying an architecture and for processing events in the architecture, according to an embodiment.

FIG. 6 illustrates an example of this efficient processing, as well as the readily-deployable, modular architecture of the present embodiments. In this example, three base components, each hosting a wrapped service component, may be distributed within an application layer. As shown, the base components include base component 1, base component 2, and base component 3, which each include the box and port pattern described above, including an input port 602, an output port 604, a service port 606, an error, log, and exception port 608, a monitoring port 610, and a control port 612.

For illustration purposes, FIG. 6 graphically represents each base component with two sets of input/output ports, which the skilled artisan would understand could be one port or multiple ports. In embodiments, each base component has at least one input port and at least one output port.

Within the framework illustrated in FIG. 6, each of base components 1, 2, 3 may host its own service component, which may be a business component, for example. The service port of each base component may expose the services of the service component to consumers, for example, via HTTP or MQ. The base components may send event messages to each other through the output and input ports, using JSON files, for example. Each base component may also include component metadata 650, a component configuration file 652, and a container manager 654.

Component metadata 650 may be defined in JSON.

Component configuration file 652 may establish how a base component communicates with other components. For example, referring back to FIG. 4, the auto-fulfillment base component 404 may have a configuration file ("ComponentConfig.Properties") as follows:

ComponentName = "Auto-fulfillment", Implementation="Java",
ProducerName="Auto-fulfillment"
TargetComponent= "Stock_Management", -continued QueueName="Autofufill_StockMgmt", EventName="Stockupdate"
TargetComponent= "Auto_Processing",
QueueName="Autofufill_Autoprocessing", EventName="orderprocess"

In that configuration file, the target components are the receiving components, stock management base component 406 and auto-processing base component 408.

Container manager 654 may be a platform from which to build, ship, and run distributed applications, and may be used to create containers in software applications. Container manager 654 may allow for packaging of an application system and for the running of that system in its own particular environment. An example of a suitable container manager 654 is Docker™, which is an open-source project that automates the deployment of code inside software containers.

Within the framework of FIG. 6, base components 1, 2, 3 may be monitored and controlled by other separate components including a management console 642 and a director 644. In embodiments, as shown in FIG. 6, base components 1, 2, 3 may be the runtime environment for a server, with director 644 controlling the server and with management console 642 receiving information from base components and displaying the information to a user through a user interface. For clarity, FIG. 6 shows only the connections and communications between base component 1 and the management console 642 and director 644. It should be understood that base components 2 and 3 would have the same connections and communications. Director 644 may also be referred to as director-controls components.

Referring to FIG. 6, monitoring port 610 of base component 1 may send information regarding the performance of base component 1 and its service component 6001, including, for example, CPU usage, heartbeat, and memory consumption. An agent present in the framework of base component 1 may capture those performance parameters, and may send the parameter data to the monitoring port 610 at regular intervals, e.g., every five minutes. In addition, error, log, and exception port 608 may send to management console 642 and to an error, log, and exception database 648 information regarding errors and exceptions of base component 1.

Management console 642 may pull the data from the monitoring port 610, the error, log, and exception port 608, and error, log, and exception database 648, and may graphically display the data through a user interface. Management console 642 may retrieve error details directly from error, log, and exception database 648 as represented by the arrow 673. The display may include a spreadsheet 670 listing the data for each component and corresponding graphs 672 of the data. For example, as represented by the arrow 674, management console 642 may display spreadsheet data fields for base component 1 (which in this case is a business component named ".BusinessCom1") and graphical illustrations 672 (e.g., x-y graphs and tables) of those data fields. The graphical illustrations 672 may include, for example, a CPU usage graph, a heartbeat graph, and an error rate table. The parameter data may be stored in monitoring database 646.

As represented by arrow 676, management console 642 may also send to director 644 a notification concerning the health of base component 1, for example, in the form of a health index.

As shown in FIG. 6, an embodiment of director 644 may include a management execution component 662, a task queue component 664, and an orchestrator component 665. Director 644 may be configured to wire a framework and an application together at startup time. In embodiments, director 644 may do this by using the event delivery platform itself. Director 644 may control each component in the framework using the component's control port (e.g., control port 612 of base component 1), which allows the component to be controlled from the outside through, for example, a user interface or command line. The control port may facilitate the sending of details in and out of components in the form of instructions. For example, wiring instructions may be passed via the control port. The control port may be used to resume and suspend components and control processing rate. For example, a user interface may send, suspend, and resume instructions for a component by seeing the health of the component and by controlling the component's throttling rate.

In embodiments, director 644 receives health parameters from monitoring port 610 as shown in FIG. 6. Upon receiving a notification from management console 642 (as represented by arrow 676), management execution component 662 of director 644 may determine whether the health of base component 1 requires action. To that end, management execution component 662 of director 644 may maintain a matrix to evaluate whether a health index crosses a limit. For example, if a health index indicates that CPU usage or memory consumption is too high, then management execution component 662 of director 644 may take steps to spin off another instance of base component 1. Management execution component 662 of director 644 may send a notification to an administration component to spin off another image of container manager 654 by configuring the configuration file 652. Management execution component 662 may keep a list of full details of each component and its metadata.

In establishing communication channels and connecting component ports to correct channels at startup, director 644, and the system of the present embodiments as a whole, may support both static and brokered component wiring. Using static component wiring, the output on a particular component port may always pass to a well-known input on some other component.

Referring again to FIG. 6, task queue component 664 may manage how many components interact with each component.

Orchestrator component 665 may orchestrate the sending of messages between components. In particular, orchestrator component 665 may help send details of input and output ports, to send and receive messages.

In embodiments, director 644 may be built on a Java application with JSON, and commands sent from director 644 may be JSON. Commands may include, for example, new services, new components to spin off, and configuration file updates. Metadata information may be stored in director database 651, and may be defined in JSON.

Commands may be sent by director 644 to base components via HTTP or MQ. Base components may wire to any MQ provider, and may be registered in director 644 by sending messages. An entire base component, including its wrapped service component, may be deployed in a container, as provided by container manager 654.

As evident from the architecture of FIG. 6, the box and port style of base components 1, 2, 3 may provide an event-driven and service-based architecture that supports many scenarios and addresses many needs, such as:

Real-Time Operational Behaviors: The box and port style computing system may accommodate real-time operational behaviors by changing the behavior of the system to dynamically react to incoming events.

Observations: The box and port style computing system may observe exceptional and error behavior and generate alerts when such behaviors occur. The job of this framework may be to produce the alerts and send notifications to the operations recipients.

Information Dissemination: The box and port style computing system may send the right information to the right consumer in the right granularity at the right time; in other words, personalized information.

Active Diagnostics: The box and port style computing system may diagnose that a problem has occurred based on observed symptoms. The system may send all information to a dashboard, including details of the problems, and may provide diagnostic support to the user.

Predictive Processing: The box and port style computing system may implement a predictive analysis that identifies a problem before it occurs, using, for example, a predictive approach, such as linear regression.

Auto-Scalability: In a component- and service-based event-driven environment, scalability may be addressed by deploying multiple instances of a single service component. Dynamic load distribution patterns such as "queue with multiple subscribers" may be used to ensure that the workload is evenly distributed across all components. In an embodiment, the dashboard may spin up the component by sending instructions to the component with manual intervention of a configuration file for Docker images, for example. An example of this auto-scalability is discussed below.

Director: As discussed above, a director may wire a framework and application together at startup time. A director may be a runtime component responsible for setting up all communication channels and connecting all component ports to the correct channels. A director may accomplish this by using the event delivery platform itself, with the components in the framework having a control port allowing control of the framework components from outside, through, for example, a user interface or command line. The control port may help send details in and out of components in the form of instructions. In embodiments, a user interface can send the suspend and resume of the component by seeing the health of the component and by controlling its throttling rate.

Monitoring: Monitoring of the box and port style computing system may provide an essential level of instrumentation, which means it is possible to observe the processing activity of the box and port framework. A monitoring port may be used by each component in the framework to publish performance statistics and send these monitoring details to a user interface for further diagnostics. The metrics collected from this framework may include, for example, (1) heartbeat monitoring; (2) the latency for every input-to-output event flow, as well as average latency; (3) wait time of every input and output; and (4) error and exception rates.

Figure 7:
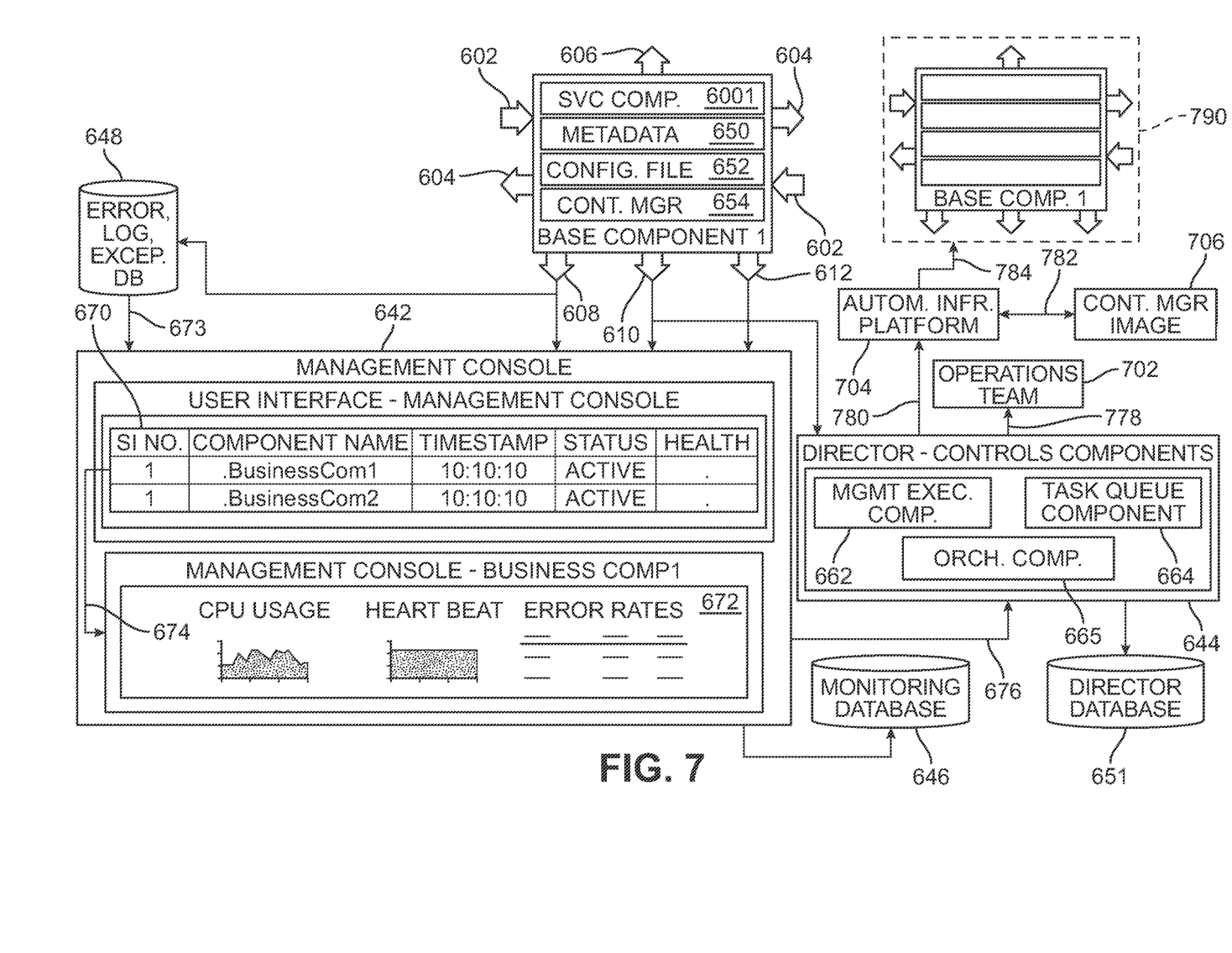
FIG. 7 is a schematic diagram of a system and method for scaling a base component, according to an embodiment.

As an example of the auto-scalability scenario and benefits described above, FIG. 7 illustrates an embodiment of a system and method for automatically scaling a base component. The system shown in FIG. 7 is based on the system shown in FIG. 6. However, for clarity, FIG. 7 shows only the base component 1, and omits base components 2 and 3. Additionally, FIG. 7 illustrates an embodiment including an operations team 702, an automated infrastructure platform 704, and a container manager image 706. Operations team 702 can be an information technology team that administers items, such as existing containers, servers, and applications. As discussed in more detail below, director 644 may have the capability to send notification emails to operations team 702 with information, such as the health status of servers, spin off details, etc. Automated infrastructure platform 704 may be, for example, Chef™, which is an automation platform that transforms infrastructure into code, automating how infrastructure is configured, deployed, and managed across a network, operating in the cloud, on-premises, or in a hybrid environment.

Automated infrastructure platform 704 may integrate with a container (e.g., a Docker container, such as the Chef plugin, Knife) to allow director 644 to launch, configure, and manage the container. Automated infrastructure platform may run inside the container and communicate with a server (e.g., Chef server) in director 644. Director 644 may keep container manager image 706 (e.g., a Docker image) of each component. Container manager image 706 may be an image file. To create container manager image 706, automated infrastructure platform 704 may bundle with a software package, runtime environment (e.g., Apache Tomcat™) and store container manager image 706 in a repository. Automated infrastructure platform 704 may provision and configure a host environment (e.g., Docker host environment). Then, automated infrastructure platform 704 may launch container instances. Automated infrastructure platform 704 may configure, monitor, and manage the new container instance.

The scenario shown in FIG. 7 addresses the need to scale base component 1. For example, if service component 6001 of base component 1 is an auto-fulfillment business component, and base component 1 is receiving a volume of orders that service component 6001 cannot handle, there would be a need to scale base component 1 to accommodate the higher volume of orders.

In a component and service based event-driven environment, scalability may be addressed by deploying multiple instances of a service component. Dynamic load distribution patterns such as "queue with multiple subscribers" may be used to ensure that the workload is evenly distributed across all components. A dashboard may spin up the component by sending instructions to the component with manual intervention of a configuration file for images of a container manager, such as Docker images.

Referring to FIG. 7, as discussed above, as represented by arrow 676, management console 642 may send to director 644 a notification concerning the health of base component 1, for example, in the form of a health index.

In response, director 644 may analyze the notification and determine that the base component 1 is not in a good state. For example, based on the health index, director 644 may determine that demand for the resources of the service component 6001 is exceeding its capacity, and that additional resources are required.

Responding to this deficiency, in step 778, director 644 may notify operations team 702. For example, director 644 may send a communication (e.g., email) to operations team 702 about the health of base component 1 and advise adding one more instance to meet the scale of users. In other words, when director 644 determines that the health of a base component requires another instance of that base component, director 644 may send a spin-off notification to operations team 702 to spin off a second instance of that base component.

Then, in step 780, director 644 may call automated infrastructure platform 704 to spin off a new instance of base component 1. Director 644 may keep a container manager image (e.g., a Docker image) of each component, which in the case of base component 1 is an auto_fulfillment image.

The container manager image may correspond to base component 1 and its respective service component 6001. In step 782, automated infrastructure platform 704 picks the appropriate container manager image 706, which in this case is the auto_fulfillment image.

Then, in step 784, director 644 uses the tools of automated infrastructure platform 704 (e.g., Chef tools) to spin off a new instance of base component 1 (as represented by the broken line box 790) and deploy the container manager image into a new server. A configuration file of the automated infrastructure platform 704 (e.g., a Chef configuration file) deploys and completes a sanity test.

To remove instances that are no longer needed, automated infrastructure platform 704 may send a message with a stop command to the server to stop the unneeded instances.

As evident from the above description, one aspect of the disclosure may provide a computer-based application system for deploying a distributed component-based application. The system may include a plurality of uniform base components. Each base component of the plurality of uniform base components may host a respective service component. Each base component may include an input port, an output port, a service port, an error, log, and exception port, a monitoring port, and a control port.

In an embodiment, the plurality of uniform base components may reside within a service layer of an application.

In another embodiment, the each base component may include component metadata associated with its respective service component, a component configuration file associated with its respective service component, and a container manager.

In another embodiment, the input port may receive event messages from a second base component of the plurality of uniform base components. The output port may send event messages to a third base component of the plurality of uniform base components. The service port may expose services of the respective service component. The error, log, and exception port may capture error information associated with the each base component and communicate the error information to a queue. The monitoring port may communicate instrumentation information associated with the each base component to a separate management component. The control port may send and receive control messages relating to functioning of the each base component and its respective service component.

In another embodiment, the system may further include a management console in communication with the monitoring port and the error, log, and exception port, and a director component in communication with the monitoring port and the control port.

In another embodiment, the management console may pull the instrumentation information from the error, log, and exception port and the monitoring port, and graphically display the instrumentation information through a user interface. The director component may control the each base component through the control port.

In another embodiment, the management console may send to the director component a notification indicating health of the each base component. In response to the notification, the director may determine whether the health of the each base component requires action.

In another embodiment, the director may determine that the health of the each base component requires another instance of the each base component, and send a spin-off notification to spin off a second instance of the each base component.

In another embodiment, the director may send the spin-off notification to an automated infrastructure platform. The automated infrastructure platform may select an image file corresponding to the each base component and its respective service component. The director may use tools of the automated infrastructure platform to spin off the second instance of the each base component and deploy the image file into a new server.

In another embodiment, the each base component may comprise a first base component, and the first base component may process event messages asynchronously with a second base component of the plurality of uniform base components and a third base component of the plurality of uniform base components.

Another aspect of the disclosure may provide a computer-implemented method for deploying a distributed component-based application. The method may include providing a plurality of uniform base components, with each base component of the plurality of uniform base components configured to receive a respective service component, and having an input port, an output port, a service port, an error, log, and exception port, a monitoring port, and a control port. The method may further include provisioning a first service component in a first base component of the plurality of uniform base components, and provisioning a second service component in a second base component of the plurality of uniform base components. The first base component may send event messages to the second base component.

In another embodiment, the method may further include deploying the first base component and the second base component within a service layer of an application.

In another embodiment, the input port may receive event messages from a second base component of the plurality of uniform base components. The output port may send event messages to a third base component of the plurality of uniform base components. The service port may expose services of the respective service component. The error, log, and exception port may capture error information associated with the each base component and communicate the error information to a queue. The monitoring port may communicate instrumentation information associated with the each base component to a separate management component. The control port may send and receive control messages relating to functioning of the each base component and its respective service component.

In another embodiment, the method may further include pulling the instrumentation information of the first base component from the error, log, and exception port of the first base component and the monitoring port of the first base component, and graphically displaying the instrumentation information of the first base component through a user interface. The method may further include controlling the first base component through the control port of the first base component.

In another embodiment, when the instrumentation information of the first base component indicates that another instance of the first base component is required, the method may further include sending a spin-off notification to spin off a second instance of the first base component.

In another embodiment, the method may further include sending the spin-off notification to an automated infrastructure platform.

In another embodiment, the method may further include provisioning a third service component in a third base component of the plurality of uniform base components, and processing event messages asynchronously between the first base component and the second base component and between the first base component and the third base component.

In another embodiment, the first service component may comprise an auto-fulfillment service component, the second service component may comprise a stock management service component, and the third service component may comprise an auto-processing service component.

Another aspect of the disclosure may provide another computer-implemented method for deploying a distributed component-based application. The method may include providing a plurality of base components. Each base component of the plurality of uniform base components may have a uniform box and port pattern. Each base component may wrap a respective service component. The method may include provisioning a first service component in a first base component of the plurality of base components, and provisioning a second service component in a second base component of the plurality of base components. The first base component may send event messages to the second base component.

In another embodiment, the method may further include deploying the first base component and the second base component within a service layer of an application.

In yet another aspect, the disclosure may provide a non-transitory computer-readable medium storing software comprising instructions executable by one or more computers which, upon such execution, cause the one or more computers to perform methods described above.

In yet another aspect, the disclosure may provide a system for deploying a distributed component-based application, including one or more computers and one or more storage devices storing instructions that are operable, when executed by the one or more computers, to cause the one or more computers to perform methods described above.

Overall, the present embodiments may beneficially achieve extensibility and maintainability with componentization across all layers in an application. The systems and method disclosed herein may sit on the cloud and provide a component-less and server-less architecture. The box and port pattern disclosed herein may provide an architecture in which components may operate in a highly independent fashion, with each component mostly unaware of any other component in the application. In this way, the components may be highly decoupled, which may enhance maintainability, extensibility, and testability, and allow changes to components with limited or no system downtime. Components may be designed and developed independently and deployed in a single system or cluster of systems, and even in a geographically distributed manner. In addition, multiple instances of the same component can be deployed as well.

In comparison to conventional approaches, the present embodiments provide technical differences and solutions in terms of (1) real-time operational behavior; (2) observation; (3) information dissemination; (4) active diagnostics; and (5) predictive processing. In addition, embodiments may be ready to use within a bounded context, in which service components may be deployed into a box (provided by a base component), with the remainder of the architecture provided by the box. In this manner, a project team working on a service component does not need to worry about the infrastructure supporting the service component; for the team, the project is a component-less and server-less architecture.

Although this disclosure may describe embodiments herein in the context of businesses such as banking or retail sales, the embodiments should be considered broadly applicable to any domain in need of processing events related to service components. For example, other domains may include mining applications, webmail, online auctions, instant messaging services, online forms, content management systems, and shopping carts.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A computer-based application system for deploying a distributed component-based application, comprising:
   a plurality of uniform base components residing within a service layer of a web application system,
   wherein each base component of the plurality of uniform base components is a software instance that hosts a respective service component and is configured to communicate with any other base component of the plurality of uniform base components,
   wherein the each base component comprises
      an input port,
      an output port,
      a service port,
      an error, log, and exception port,
      a monitoring port, and
      a control port,
   wherein the respective service component comprises core service logic for executing a service functionality and interacts indirectly with other service components using one or more ports of its respective base component,
   wherein each base component of the plurality of uniform base components transforms the core service logic of its respective service component to technical information and communicates the technical information to other base components,
   wherein each base component of the plurality of uniform base components executes the service functionality of its respective service component based on event messages, without invoking methods of other base components,
   wherein each base component of the plurality of uniform base components asynchronously processes service requests with its respective service component by receiving event messages directly from any other base component at the input port and sending event messages directly to any other base component from the output port,
   wherein a first base component of the plurality of uniform base components processes an event message asynchronously with a second base component of the plurality of uniform base components by:
      sending the event message from the output port of the first base component directly to the input port of the second base component,
      continuing to process other event messages while awaiting a response from the second base component,
      receiving through the input port of the first base component a response to the event message directly from the output port of the second base component,
      correlating the response to the event message, and acting according to the response,
   wherein the input port of the first base component receives the event message from a third base component of the plurality of uniform base components,
   wherein the output port of the first base component sends the event message to the second base component,
   wherein the service port of the first base component exposes services of the respective service component,
   wherein the error, log, and exception port of the first base component captures error information associated with the first base component and communicates the error information to a queue,
   wherein the monitoring port of the first base component communicates instrumentation information associated with the first base component to a separate management component, and
   wherein the control port of the first base component sends and receives control messages relating to functioning of the first base component and its respective service component.

2. The system of claim 1, wherein the first base component triggers generation of the event message and placement of the event message into a message queue, after which the second base component receives the event message from the message queue and processes the event message upon arrival.

3. The system of claim 1, wherein the each base component further comprises:
   component metadata associated with its respective service component;
   a component configuration file associated with its respective service component; and
   a container manager that automates deployment of code inside software containers.

4. The system of claim 1, further comprising:
   a management console in communication with the monitoring port and the error, log, and exception port; and
   a director component in communication with the monitoring port and the control port.

5. The system of claim 4, wherein the management console pulls the instrumentation information from the error, log, and exception port and the monitoring port, and graphically displays the instrumentation information through a user interface, and
   wherein the director component controls the first base component through the control port.

6. The system of claim 5, wherein the management console sends to the director component a notification indicating a health index of the first base component,
   wherein the health index is based on CPU usage and memory consumption,
   wherein in response to the notification, the director determines whether the health index of the first base component has crossed a health index limit.

7. The system of claim 6, wherein the director determines that the health index of the first base component has crossed the health index limit and therefore requires another software instance of the first base component, and sends a spin-off notification to create and spin off a new second software instance of the first base component.

8. The system of claim 7, wherein the director sends the spin-off notification to an automated infrastructure platform,
   wherein the automated infrastructure platform selects an image file corresponding to the first base component and its respective service component, and
   wherein the director uses tools of the automated infrastructure platform to spin off the second software instance of the first base component and deploy the image file into a new server.

9. The system of claim 1, wherein the first base component processes event messages asynchronously with the third base component of the plurality of uniform base components, and
wherein the input port, the output port, the service port, the error, log, and exception port, the monitoring port, and the control port of each base component of the plurality of uniform base components are arranged in a box pattern that is uniform for all base components of the plurality of uniform base components so as to be pairable with any one of the service components and suitable for managing communications with any other paired base component.

10. A computer-implemented method for deploying a distributed component-based application, comprising:
providing a plurality of uniform base components residing within a service layer of a web application system,
wherein each base component of the plurality of uniform base components is a software instance that is configured to receive a respective service component and to communicate with any other base component of the plurality of uniform base components,
wherein the each base component comprises
an input port,
an output port,
a service port,
an error, log, and exception port,
a monitoring port, and
a control port,
wherein the respective service component comprises core service logic for executing a service functionality and interacts indirectly with other service components using one or more ports of its respective base component,
wherein each base component of the plurality of uniform base components transforms the core service logic of its respective service component to technical information and communicates the technical information to other base components,
wherein each base component of the plurality of uniform base components executes the service functionality of its respective service component based on event messages, without invoking methods of other base components, and
wherein each base component of the plurality of uniform base components asynchronously processes service requests with its respective service component by receiving event messages directly from any other paired base component at the input port and sending event messages directly to any other paired base component from the output port;
provisioning a first service component in a first base component of the plurality of uniform base components; and
provisioning a second service component in a second base component of the plurality of uniform base components,
wherein the first base component processes an event message asynchronously with the second base component by:
sending the event message from the output port of the first base component directly to the input port of the second base component,
continuing to process other event messages while awaiting a response from the second base component,
receiving through the input port of the first base component a response to the event message directly from the output port of the second base component,
correlating the response to the event message, and acting according to the response,
wherein the input port of the first base component receives the event message from a third base component of the plurality of uniform base components,
wherein the service port of the first base component exposes services of the respective service component,
wherein the error, log, and exception port of the first base component captures error information associated with the first base component and communicates the error information to a queue,
wherein the monitoring port of the first base component communicates instrumentation information associated with the first base component to a separate management component, and
wherein the control port of the first base component sends and receives control messages relating to functioning of the first base component and its respective service component.

11. The method of claim 10, wherein the first base component triggers generation of the event message and placement of the event message into a message queue, after which the second base component receives the event message from the message queue and processes the event message upon arrival.

12. The method of claim 10, further comprising:
pulling the instrumentation information of the first base component from the error, log, and exception port of the first base component and the monitoring port of the first base component, and graphically displaying the instrumentation information of the first base component through a user interface; and
controlling the first base component through the control port of the first base component.

13. The method of claim 12, wherein when the instrumentation information of the first base component indicates that another software instance of the first base component is required, sending a spin-off notification to create and spin off a new second software instance of the first base component.

14. The method of claim 13, further comprising sending the spin-off notification to an automated infrastructure platform,
wherein the automated infrastructure platform selects an image file corresponding to the first base component and its respective service component;
using tools of the automated infrastructure platform to spin off the second software instance of the each base component and deploy the image file into a new server; and
when the second software instance is no longer needed, having the automated infrastructure platform send a message with a stop command to the new server to stop the second software instance.

15. The method of claim 10, further comprising:
provisioning a third service component in the third base component of the plurality of uniform base components; and
processing event messages asynchronously between the first base component and the third base component.

16. The method of claim 15, wherein the first service component comprises an auto-fulfillment service component, the second service component comprises a stock management service component, and the third service component comprises an auto-processing service component.

17. A computer-implemented method for deploying a distributed component-based application, comprising:
providing a plurality of uniform base components residing within a service layer of a web application system,
wherein each base component of the plurality of uniform base components comprises a software instance that is configured to communicate with any other base component of the plurality of uniform base components and defines an input port, an output port, a service port, an error, log, and exception port, a monitoring port, and a control port,
wherein each base component wraps a respective service component,
wherein the respective service component comprises core service logic for executing a service functionality and interacts indirectly with other service components using one or more ports of its respective base component,
wherein each base component of the plurality of uniform base components executes the service functionality of its respective service component based on event messages, without invoking methods of other base components,
wherein each base component of the plurality of uniform base components is configured to transform the core service logic of its respective service component to technical information and to communicate the technical information to other base components, and
wherein each base component of the plurality of uniform base components is configured to asynchronously process service requests with its respective service component by receiving event messages directly from any other paired base component at the input port and sending event messages directly to any other paired base component from the output port;
provisioning a first service component in a first base component of the plurality of base components; and
provisioning a second service component in a second base component of the plurality of base components,
wherein the first base component processes an event message asynchronously with the second base component by:
sending the event message from the output port of the first base component directly to the input port of the second base component,
continuing to process other event messages while awaiting a response from the second base component,
receiving through the input port of the first base component a response to the event message directly from the output port of the second base component,
correlating the response to the event message, and
acting according to the response.

18. The method of claim 17, wherein the first base component triggers generation of the event message and placement of the event message into a message queue, after which the second base component receives the event message from the message queue and processes the event message upon arrival.

19. The method of claim 17, further comprising:
pulling instrumentation information of the first base component from the error, log, and exception port of the first base component and the monitoring port of the first base component, and graphically displaying the instrumentation information of the first base component through a user interface; and
controlling the first base component through the control port of the first base component,
wherein when the instrumentation information of the first base component indicates that another software instance of the first base component is required, sending a spin-off notification to create and spin off a new second software instance of the first base component.

20. The method of claim 19, further comprising:
sending the spin-off notification to an automated infrastructure platform, wherein the automated infrastructure platform selects an image file corresponding to the first base component and its respective service component;
using tools of the automated infrastructure platform to spin off the second software instance of the each base component and deploy the image file into a new server; and
when the second software instance is no longer needed, having the automated infrastructure platform send a message with a stop command to the new server to stop the second software instance.

* * * * *